(12) United States Patent
Lu

(10) Patent No.: US 8,072,786 B2
(45) Date of Patent: Dec. 6, 2011

(54) POWER SUPPLY MODULE WITH POWER SAVING MODE

(75) Inventor: Jian-Hui Lu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 195 days.

(21) Appl. No.: 12/566,688

(22) Filed: Sep. 25, 2009

(65) Prior Publication Data
US 2010/0246229 A1 Sep. 30, 2010

(30) Foreign Application Priority Data
Mar. 26, 2009 (CN) .................... 2009 1 0301157

(51) Int. Cl.
*H02M 7/217* (2006.01)

(52) U.S. Cl. ............... 363/89; 363/65; 363/86; 363/127; 323/268

(58) Field of Classification Search ............. 363/65, 363/68, 86, 89, 125, 127; 323/268
See application file for complete search history.

(56) References Cited

U.S. PATENT DOCUMENTS

| | | | |
|---|---|---|---|
| 5,019,717 A * | 5/1991 | McCurry et al. | 307/66 |
| 6,031,743 A * | 2/2000 | Carpenter et al. | 363/65 |
| 6,714,425 B2 * | 3/2004 | Yamada et al. | 363/21.12 |
| 2009/0102294 A1* | 4/2009 | Hodges et al. | 307/126 |
| 2009/0154206 A1* | 6/2009 | Fouquet et al. | 363/84 |
| 2010/0202161 A1* | 8/2010 | Sims et al. | 363/20 |
| 2010/0308778 A1* | 12/2010 | Yamazaki et al. | 323/234 |
| 2011/0057724 A1* | 3/2011 | Pabon | 327/581 |

FOREIGN PATENT DOCUMENTS

CN 1925298 A 3/2007

* cited by examiner

*Primary Examiner* — Adolf Berhane
*Assistant Examiner* — Fred E Finch, III
(74) *Attorney, Agent, or Firm* — Altis Law Group, Inc.

(57) ABSTRACT

A power supply module is configured for converting an AC voltage to a first DC voltage and applying the first DC voltage to a load. The power supply module includes a rectifying and filtering unit, a PFC unit, a voltage transforming unit, an input port, and a switch unit. The rectifying and filtering unit rectifies the AC voltage into a primary DC voltage and filters the primary DC voltage. The PFC unit corrects a power factor of the filtered primary DC voltage. The voltage transforming unit converts the corrected primary DC voltage and generates the first DC voltage for applying the load. The input port receives a first instruction or a second instruction and generates a first signal or a second signal, respectively. The switch unit establishes or disconnects an electrical connection between the voltage transforming unit and the load according to the first signal or the second signal.

17 Claims, 2 Drawing Sheets

POWER SUPPLY MODULE WITH POWER SAVING MODE

BACKGROUND

1. Technical Field

The present disclosure relates to power supplies and, particularly, to a power supply module with power saving mode.

2. Description of Related Art

Electronic devices powered by a power supply module correspond to rated input voltages. The power supply modules are charged by incoming Alternating Current (AC), and generate Direct Current (DC) voltage to power the electronic devices. The power supply module provides a power supply mode and a power saving mode. When the power supply module is in the power supply mode, DC voltage is supplied to the electronic device. When in the power saving mode, the module hibernates. However, even while hibernating, the power supply module still transmits voltage to the load, constituting waste of power.

Therefore, what is needed is to provide a power supply module which can address the problem described above.

DETAILED DESCRIPTION

Figure 1:
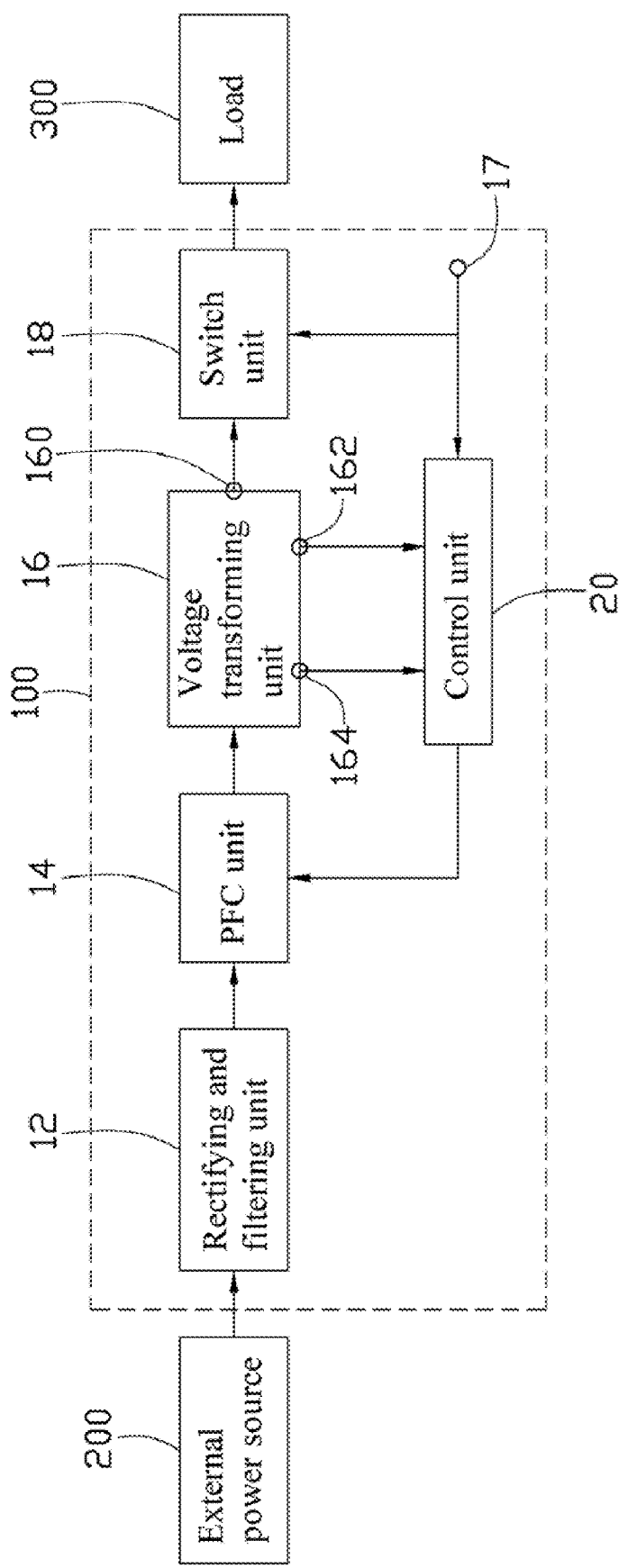
FIG. 1 is a functional block diagram of a power supply module, according to an exemplary embodiment.

Referring to FIG. 1, a power supply module 100 supplies power received from an external power source 200, such as a mains power system, to a load 300 when operating in a power supply mode, and inhibiting or stopping supplying of power when the power supply module 100 is operating in a power saving mode. The power supply module 100 includes a rectifying and filtering unit 12, a power factor correction (PFC) unit 14, a voltage transforming unit 16, an input port 17, a switch unit 18, and a control unit 20.

The rectifying and filtering unit 12 is electrically connected between the external power source 200 and the PFC unit 14, for rectifying an alternating current (AC) voltage from the external power source 200 into a primary direct current (DC) voltage and filtering the primary DC voltage to the PFC unit 14. The rectifying and filtering unit 12 includes a bridge rectifier and a low-pass filter circuit. The bridge rectifier is configured for providing the rectifying function for the AC voltage and generating the primary DC voltage. The low-pass filter circuit is configured for providing the high-block function for the rectified primary DC voltage.

The PFC unit 14 is configured for correcting a power factor of the filtered primary DC voltage and transmitting the corrected primary DC voltage to the voltage transforming unit 16. When the PFC unit 14 is powered on, the PFC unit 14 corrects the power factor of the filtered primary DC voltage. When PFC unit 14 is powered off, the PFC unit 14 transmits the filtered primary DC voltage to the voltage transforming unit 16. In particular, the PFC unit 14 brings voltage and current into phase, such that both can hold on the same level.

The voltage transforming unit 16 is configured for generating a first DC voltage configured for applying power to the load 300, a second DC voltage configured for applying power to the control unit 20, and a third DC voltage configured for applying power to the PFC unit 14. The voltage transforming unit 16 includes a first port 160, a second port 162, and a third port 164. The first port 160 is configured for outputting the first DC voltage, the second port 162 is configured for outputting the second DC voltage, and the third port 164 is configured for outputting the third DC voltage. In one embodiment, the voltage transforming unit 16 is a converter. The voltage transforming unit 16 includes a primary coil, a first secondary coil, a second secondary coil, and a third secondary coil. The first secondary coil, the second secondary coil, and the third secondary coil induct electromotive forces according to the variable current through the primary coil, and generate the first DC voltage, the second DC voltage and the third DC voltage correspondingly.

The input port 17 is configured for receiving a first instruction or a second instruction and generating a first signal or a second signal correspondingly. In this embodiment, the first signal is a high level signal and the second signal is a low level signal. In other embodiments, the first signal can be the low level signal and the second signal can be the high level signal. According to the first instruction, the power supply module 100 is operating in a power supply mode; and according to the second instruction, the power supply module 100 is operating in a power saving mode.

The switch unit 18 is configured for establishing or disconnecting an electrical connection between the first port 160 and the load 300 according to the first signal or the second signal. For example, according to the first signal, the switch unit 18 is switched on to establish the electrical connection between the first port 160 and the load 300, allowing the first port 160 to apply the first DC voltage to the load 300. Similarly, according to the second signal, the switch unit 18 is switched off to disconnect the electrical connection between the first port 160 and the load 300, so as to inhibit or stop applying the first DC voltage to the load 300.

Figure 2:
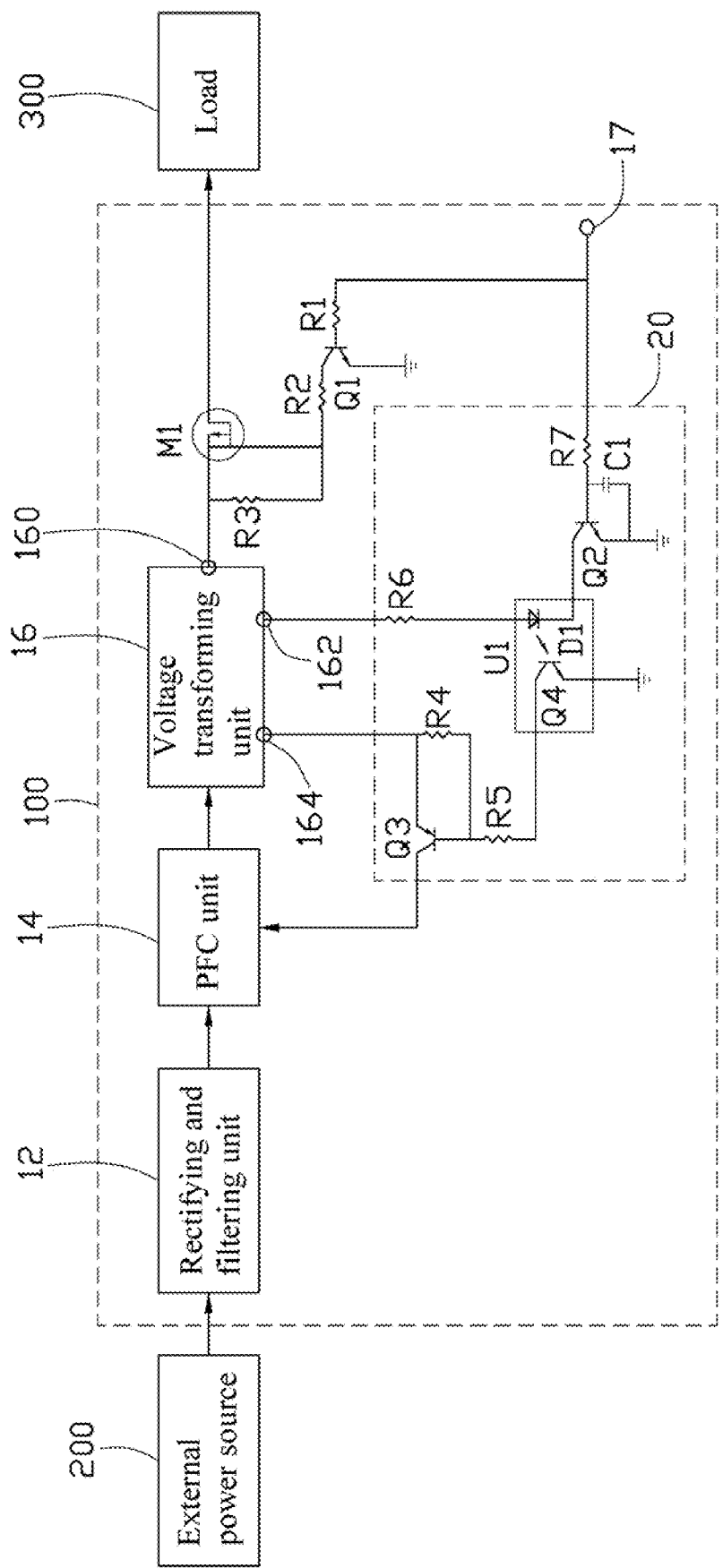
FIG. 2 is a partial circuit diagram of the power supply module of FIG. 1.

Further referring to FIG. 2, the switch unit 18 includes a first transistor Q1, a metal oxide semiconductor (MOS) transistor M1, a first resistor R1, a second resistor R2, and a third resistor R3. The first transistor Q1 includes a base, a collector, and an emitter. The MOS transistor M1 includes a gate, a drain, and a source. In this embodiment, the first transistor Q1 is a NPN bipolar junction transistor; and the MOS transistor M1 is an enhancement P type channel MOS transistor. The source of the MOS transistor M1 is electrically connected to the first port 160 and the drain of the MOS transistor M1 is electrically connected to the load 300. The third resistor R3 is electrically connected between the source and the gate of the MOS transistor M1. The second resistor R2 is electrically connected between the gate of the MOS transistor M1 and the collector of the first transistor Q1. The first resistor R1 is electrically connected between the base of the first transistor Q1 and the input port 17. The emitter of the first transistor Q1 is electrically grounded.

When the input port 17 generates the first signal in the high level signal, the first transistor Q1 is conducting, and the collector of the first transistor Q1 is electrically grounded. The second resistor R2 and the third resistor R3 function as divider resistors, so that the first DC voltage from the first port 160 is dividable. For example, the voltage of third resistor R3 is VR1, and the voltage of the gate-source voltage is −VR1 less than 0V. Thus, the MOS transistor M1 is conducting, and the first DC voltage of the first port 160 is applied to the load 300.

When the input port 17 generates the second signal in the low level signal, the first transistor Q1 is cut off, and the collector-emitter voltage of the first transistor Q1 is in high impedance. The current through the collector and the emitter of the first transistor Q1 is small enough that the voltage of the third resistor R3 is low. As a result, the source-gate voltage cannot conduct the MOS transistor M1, and the electrical connection between the first port 160 and the load 300 is disconnected.

The control unit 20 is applied by the second DC voltage from the second port 162, and is configured for establishing or disconnecting an electrical connection between the third port 164 and the PFC unit 14 according to the first signal or the second signal. For example, when the control unit 20 is applied by the second DC voltage, the control unit 20 allows the third port 164 to apply the third DC voltage to the PFC unit 14 according to the first signal, and the PFC unit 14 corrects the power factor of the filtered primary DC voltage. According to the second signal, the control unit 20 disconnects the electrical connection between the third port 164 and the PFC unit 14, and the PFC unit 14 powers off the PFC unit 14. Then the PFC unit 14 functions as a transmission line for transmitting the filtered primary DC voltage to the voltage transforming unit 16.

The control unit 20 includes a second transistor Q2, a filter capacitor C1, a third transistor Q3, an optical coupler U1, a fourth resistor R4, a fifth resistor R5, a sixth resistor R6, and a seventh resistor R7. The second transistor Q2 includes a base, a collector, and an emitter, as does the third transistor Q3. In this embodiment, the second transistor Q2 is a NPN bipolar junction transistor, the third transistor Q3 is a PNP bipolar junction transistor. The optical coupler U1 includes a fourth transistor Q4 and a light-emitting diode (LED) D1. The fourth transistor Q4 includes a base, a collector, and an emitter. The LED D1 includes an anode and a cathode. The emitter and the collector of the fourth transistor Q4 together form the output ports of the optical coupler U1, and the anode and the cathode of the LED D1 together form the input ports of the optical coupler U1. The collector of the third transistor Q3 is electrically connected to the PFC unit 14. The emitter of the third transistor Q3 is electrically connected to the third port 164 to be applied by the third DC voltage. The base of the third transistor Q3 is electrically connected to the emitter of the optical coupler U1 via the fifth resistor R5. The collector of the optical coupler U1 is electrically grounded. The second port 162 is electrically connected to the anode of the LED D1 via the sixth resistor R6. The cathode of the LED D1 is electrically connected to the collector of the second transistor Q2. The filter capacitor C1 is electrically connected between the base and the emitter of the second transistor Q2. The emitter of the second transistor Q2 is electrically grounded, and the base of the second transistor Q2 is electrically connected to the input port 17 via the seventh resistor R7.

When the input port 17 generates the first signal in the high level signal, the second transistor Q2 is conducting, and the second port 162 applies to the LED D1 via the sixth resistor R6. As a result, the LED D1 is conducting, and the fourth transistor Q4 of the optical coupler U1 is conducting. The base-emitter voltage of the third transistor Q3 is the voltage of the fourth resistor R4, and the third transistor Q3 is conducting. Thus, the third DC voltage applies to the PFC unit 14, and the PFC unit 14 is powered on.

When the input port 17 generates the second signal in the low level signal, the second transistor Q2 is cut off. The collector-emitter voltage of the second transistor Q2 is in high impedance, and the optical coupler U1 is cut off as the LED D1 is cut off. Thus, the current through the collector and the emitter of the third second transistor Q4, and the voltage of the fourth resistor R4 are too small to conduct the third transistor Q3. The PFC unit 14 is disabled to electrically connect to the third port 164, and the PFC unit 14 is powered off.

As described, when the input port 17 outputs the second signal, the power supply module 100 is operating in power saving mode, and the switch unit 18 turns off to disconnect the electrical connection between the first port 160 and the load 300. As a result, the load 300 cannot consume any power in the power saving mode. At the same time, according to the second signal, the control unit 20 directs the voltage transforming unit 16 to stop applying voltage to the PFC unit 14, and the PFC unit 14 is out of the power factor corrective function to consume any power. Thus, the power supply module 100 further saves power.

It is to be understood, however, that even though numerous has been described with reference to particular embodiments, but the present invention is not limited to the particular embodiments described and exemplified, and the embodiments are capable of considerable variation and modification without departure from the scope of the appended claims.

What is claimed is:

1. A power supply module configured for converting an alternating current (AC) voltage to a first direct current (DC) voltage and applying the first DC voltage to a load, the power supply module comprising:
a rectifying and filtering unit configured for rectifying the AC voltage into a primary DC voltage and filtering the primary DC voltage;
a power factor correction (PFC) unit configured for correcting a power factor of the filtered primary DC voltage;
a voltage transforming unit configured for converting the corrected primary DC voltage and generating the first DC voltage;
an input port configured for receiving a first instruction or a second instruction and generating a first signal or a second signal correspondingly; and
a switch unit coupled between the voltage transforming unit and the load, the switch unit configured for establishing an electrical connection between the voltage transforming unit and the load for applying the first DC voltage to the load according to the first signal, or configured for disabling the electrical connection between the voltage transforming unit and the load to stop applying the first DC voltage to the load according to the second signal, wherein the switch unit comprises:
a first transistor comprising a base, a collector, and an emitter, the base electrically connected to the input port, and the emitter electrically grounded;
a metal oxide semiconductor (MOS) transistor comprising a gate, a drain, and a source, the gate electrically connected to the collector of the first transistor, the drain electrically connected to the load, and the source selectively receiving the first DC voltage; and
a first resistor, electrically connected between the source and the gate of the MOS transistor.

2. The power supply module of claim 1, wherein the switch unit comprises:
a second resistor;
the base of the first transistor electrically connected to the input port via the second resistor; and
a third resistor;
the gate of the MOS transistor electrically connected to the collector of the first transistor via the third resistor.

3. The power supply module of claim 2, wherein the first transistor is a NPN bipolar junction transistor.

4. The power supply module of claim 2, wherein the MOS transistor is an enhancement P type channel MOS transistor.

5. The power supply module of claim 1, wherein when the PFC unit is powered on, the PFC unit performs the power factor corrective function; when the PFC unit is powered off, the PFC unit functions as a transmission line for transmitting the filtered primary DC voltage to the voltage transforming unit.

6. The power supply module of claim 1, wherein the voltage transforming unit is further configured for generating a second DC voltage and a third DC voltage, and the third DC voltage is configured for applying to the PFC unit.

7. The power supply module of claim 6, further comprising: a control unit receiving the second DC voltage and configured for allowing or disabling the third DC voltage to apply to the PFC unit according to the first signal or the second signal.

8. The power supply module of claim 7, wherein the control unit comprises:
   a second transistor comprising a base, a collector, and an emitter, the emitter of the second transistor electrically grounded;
   a third transistor comprising a base, a collector, and an emitter, the emitter of the third transistor selectively receiving the third DC voltage, the collector of the third transistor electrically connected to the PFC unit;
   a fourth resistor, electrically connected between the emitter and the base of the third transistor;
   a fifth resistor;
   a sixth resistor;
   an optical coupler comprising:
      a fourth transistor comprising a base, a collector, and an emitter, the collector of the fourth transistor electrically connected to the base of the third transistor via the fifth resistor, the emitter of the fourth transistor electrically grounded; and
      a light-emitting diode (LED) comprising an anode and a cathode, the anode selectively receiving the second DC voltage via the sixth resistor, the cathode electrically connected to the collector of the second transistor; and
   a seventh resistor, electrically connected between the input port and the base of the second transistor.

9. The power supply module of claim 8, wherein the control unit further comprises a filter capacitor, electrically connected between the base and the emitter of the second transistor.

10. The power supply module of claim 8, wherein the second transistor is a NPN bipolar junction transistor.

11. The power supply module of claim 8, wherein the third transistor is a PNP bipolar junction transistor.

12. The power supply module of claim 6, wherein the voltage transforming unit comprises a first port configured for outputting the first DC voltage, a second port configured for outputting the second DC voltage, and a third port configured for outputting the third DC voltage.

13. The power supply module of claim 1, wherein the first signal is a high level signal, and the second signal is a low level signal, and wherein the power supply module assumes a power supply mode according to the high level signal, and a power saving mode according to the low level signal.

14. The power supply module of claim 1, wherein the rectifying and filtering unit comprises a bridge rectifier and a low-pass filter circuit, the bridge rectifier is configured for providing the rectifying function for the AC voltage and generating the primary DC voltage, the low-pass filter circuit is configured for providing a high-block function for the rectified primary DC voltage.

15. A power supply module capable of operating between a power supply mode and a power saving mode, the power supply module configured for converting an alternating current (AC) voltage into a load direct current (DC) voltage and applying the first DC voltage to a load, the power supply module comprising:
   a rectifying and filtering unit configured for rectifying the AC voltage into a primary DC voltage and filtering the primary DC voltage;
   a power factor correction (PFC) unit configured for correcting a power factor of the filtered primary DC voltage;
   a voltage transforming unit configured for converting the corrected primary DC voltage and generating the first DC voltage and a second DC voltage; and
   a control unit configured for receiving the second DC voltage, a first instruction, and a second instruction; and
   a switch unit;
   wherein when the control unit receives the first instruction, the switch unit is actuated for switching the power supply module to the power supply mode, so as to apply the first DC voltage to the load; when the control unit receives the second instruction, the switch unit is actuated for switching the power supply module to the power saving mode, so as to stop applying the first DC voltage to the load, the switch unit comprises:
   a first transistor comprising a base, a collector, and an emitter, the base electrically connected to the input port, and the emitter electrically grounded;
   a metal oxide semiconductor (MOS) transistor comprising a gate, a drain, and a source, the gate electrically connected to the collector of the first transistor, the drain electrically connected to the load, and the source selectively receiving the first DC voltage; and
   a first resistor, electrically connected between the source and the gate of the MOS transistor.

16. The power supply module of claim 15, wherein the voltage transforming unit is further configured for generating a third DC voltage, and the third DC voltage is configured for applying to the PFC unit.

17. The power supply module of claim 15, wherein when the PFC unit is powered on, the PFC unit performs the power factor corrective function; when the PFC unit is powered off, the PFC unit transmits the filtered primary DC voltage to the voltage transforming unit.

* * * * *